UNITED STATES PATENT OFFICE.

WILLIS A. GIBBONS, OF FLUSHING, NEW YORK, ASSIGNOR TO AMERICAN RUBBER COMPANY, A CORPORATION OF MASSACHUSETTS.

AEROPLANE STRUCTURAL ELEMENT.

1,290,832.

Specification of Letters Patent.  Patented Jan. 7, 1919.

No Drawing.  Application filed January 10, 1916. Serial No. 71,200.

*To all whom it may concern:*

Be it known that I, WILLIS A. GIBBONS, a citizen of the United States, residing at Flushing, L. I., county of Queens, and State of New York, have invented certain new and useful Improvements in Aeroplane Structural Elements, of which the following is a full, clear, and exact description.

This invention relates to aeroplane structural elements and has for an object to provide superior qualities therein, for this particular purpose, and reduce to a minimum the labor and expense of manufacture and maintenance of air craft.

The present method of manufacturing aeroplane wings for instance, consists in stretching fabric upon the wing frame, and painting with nitro cellulose or some other varnish to impart a smooth impervious surface, and the latter step must be repeated from time to time to give maximum efficiency. Frequently rubberized fabric is used. The reason for the use of rubber is that it imparts a smooth surface which does not require frequent varnishing to render it impervious.

However, both ordinary rubberized and varnished fabrics are objectionable because the product is affected by weather and service conditions, variations in tension and contour being particularly noticeable. The present invention obviates the above and other disadvantages by the provision of a supporting sheet which is ready for use without further treatment, and requires no subsequent treatment during the life of the machine and which can be built into not only the wings but other structural parts of the machine, or may even form the parts themselves.

In carrying out the invention, I preferably coat, by a spreader, or by a calendar, or by both, or otherwise, a sheet of fabric with a hard rubber composition, and vulcanize the composition to the fabric while the rubber is in contact with metal foil which imparts a polished, glass-like surface to the resultant product or supporting sheet.

The resultant product is a vulcanized hard rubber and fabric sheet forming a unitary integral structure which may be shaped during or prior to building of the machine to constitute various structural elements such as wings, hollow spars, pontoons, etc., and may be used alone or in combination with other material, to form said parts.

The material will be characterized by a smooth surface similar to glass. It will further be characterized by said surface being impervious. It will still further be characterized by a greater hardness and resistance to distortion under weather and service conditions than the usual sized or rubber treated fabric.

To distinguish between the ordinary rubber treated fabric now sometimes used, and the product of the present invention, it may be said that in the ordinary rubberized fabric product the rubber is simply a more or less waterproof and perfectly elastic and flexible coat imparting no rigidity, strength, or body to the fabric. On the contrary hard rubber treated fabric exhibits decidedly appreciable hardness, strength, and rigidity or resistance to distortion, these properties being determined by the hard rubber itself.

Past efforts of rubber manufacturers in producing rubberized aeroplane fabric have been practically fruitless. This is probably due to variations of tension, contour, etc., resulting in the product under varying weather and service conditions. The tension and contour of hard rubber treated fabric are unaffected by weather and service conditions. Hard rubber treated fabric offers greater resistance to tearing and is more difficult to cut, on account of its greater rigidity, than ordinary rubber treated fabric or even sized fabric, and thus is particularly adapted for use in structural parts of aeroplanes.

As far as I know I am the first to produce structural material for air craft comprising hard rubber compound vulcanized in unitary integral association with a backing of non-plastic material. Therefore, I do not limit myself to the combination of vulcanized hard rubber compound with fibers, either separate or spun and woven into fabric, but mean the scope of the invention to include even metallic or other wires either separate or woven into a gauze or mesh.

I do not limit myself to the number of layers of the coat of hard rubber composition, nor to the particular surface of the backing to which the coat is applied since one surface or both surfaces may be coated with one or more layers as desired.

It will be understood that a suitable frame for supporting the sheet of material is employed.

Having thus described my invention, what I claim as new and desire to protect by Letters Patent is:

An air-plane structural element embodying therein a sheet of non-plastic material having a coating of hard rubber vulcanized thereto, the outer surface of said rubber coating having imparted thereto the characteristics of rubber vulcanized in contact with a metal surface and being substantially frictionally non-resistant to air and water, and a frame for supporting said sheet.

Signed at New York, N. Y., this 8th day of January, 1916.

WILLIS A. GIBBONS.